Jan. 11, 1944.     J. M. HAIT     2,338,937
OPEN LINE SHAFT BEARING
Filed Sept. 29, 1941
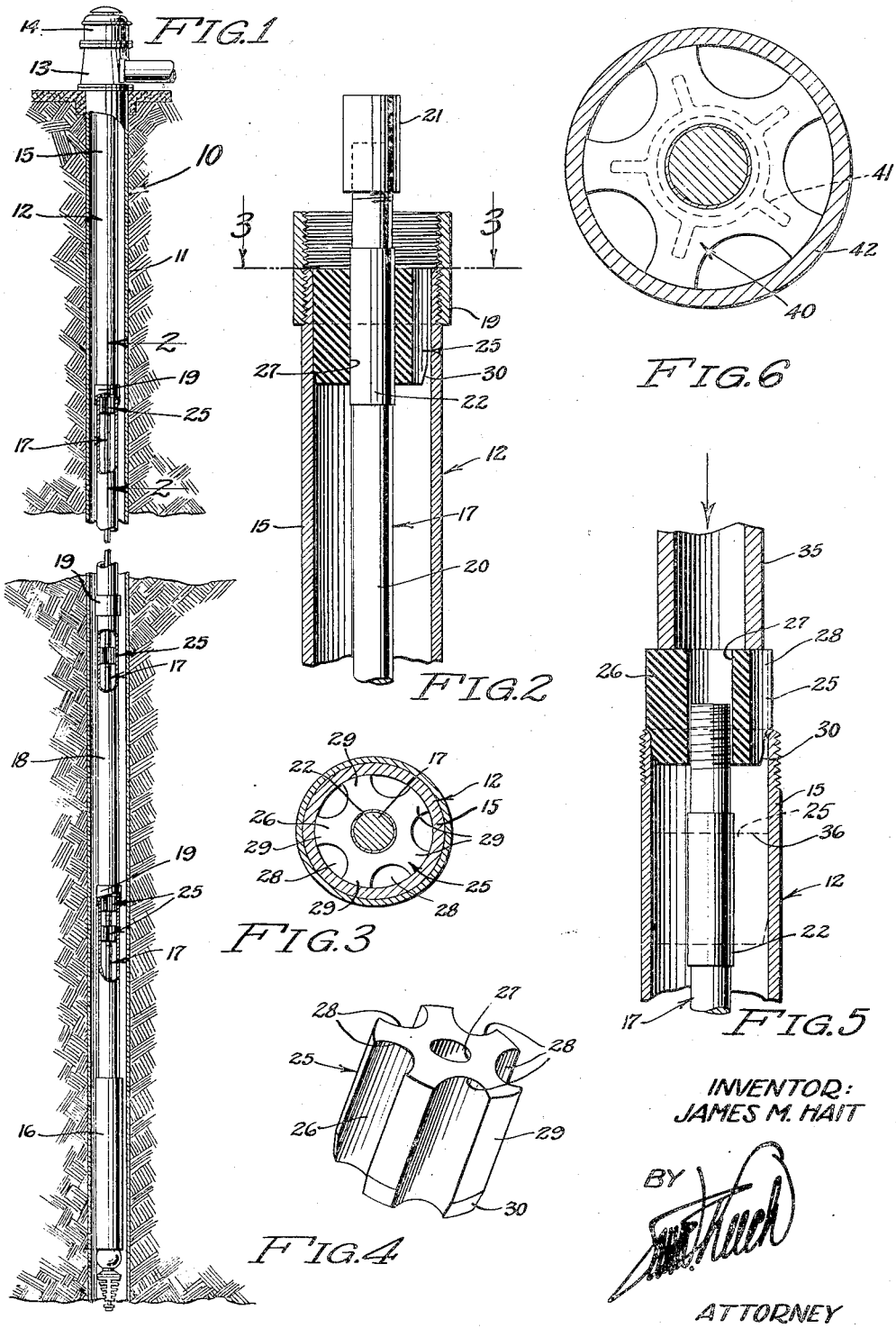
INVENTOR:
JAMES M. HAIT
ATTORNEY Patented Jan. 11, 1944

2,338,937

UNITED STATES PATENT OFFICE 2,338,937

OPEN LINE SHAFT BEARING

James M. Hait, San Gabriel, Calif., assignor to Food Machinery Corporation, San Jose, Calif., a corporation of Delaware Application September 29, 1941, Serial No. 412,769

5 Claims. (Cl. 308—4)

This invention relates to the rotary water well pumping art and particularly to open line shaft bearings such as are required in rotary pumping equipment employed in deep water wells.

The bearings in common use in this type of equipment include a metal spider having an outer ring which fits in between the abutting ends of adjacent sections of pump tubing and an inner housing for a rubber bearing sleeve through which the pump shaft extends. The metal spiders used in these bearings have to be cast and machined and it is an object of this invention to provide a bearing which will take the place of these metal spider bearings of the prior art and which will be less expensive to manufacture.

It is customary practice in this art to provide the pump shaft where this journals in the bearings with a wear-resistant sleeve of some sort, and in assembling the pump shaft and pump tubing in the well it is of course necessary to locate these sleeves within the rubber bearings provided for them. As the metal spider bearings in common use can only be located at a joint in the pump tubing, it is necessary to do considerable cutting and threading of the pump tubing in the field to properly locate these bearings relative to the wear-resistant sleeves on the shaft.

It is another object of my invention to provide an open line shaft bearing which is adapted to take the place of the metal spider type of open line shaft bearing above referred to and which will obviate the necessity of cutting the tubing in the field in order to properly locate the bearing with respect to the wear-resistant sleeves on the shaft.

Another disadvantage inherent in open line shaft bearings having a metal spider and mounted between adjacent ends of the well tubing within the couplings is that this metal spider is made of bronze and a galvanic action is thus set up between the dissimilar metals of the spider and the metal tubing.

It is a still further object of my invention to provide an open line shaft bearing which will take the place of the metal spider bearing now in common use and which will be free from galvanic action.

The corrosive resistant bearing surfaces provided on the shaft are frequently longer than the bearing itself and yet the wear produced in this shaft surface by abrasives in the pumped water, takes place only where the bearing is. The rubber bearing itself does not generally wear nearly as rapidly as the metal shaft surface and it is yet another object of my invention to provide a rubber bearing which may be shifted to a different portion of the shaft surface after the portion where it was formerly located has become worn from abrasives.

The manner of accomplishing the foregoing objects, as well as further objects and advantages, will be made manifest in the following description taken in connection with the following drawing, in which:

Fig. 1 is a diagrammatic, vertical, sectional view of a deep well water pump installation with portions of the pump tubing broken away to illustrate the manner in which the bearing of my invention is installed therein.

Fig. 2 is an enlarged, vertical, sectional view taken on the line 2—2 of a portion of the pump tubing and illustrating one of the bearings of my invention installed therein.

Fig. 3 is a cross-sectional view taken on the line 3—3 of Fig. 2.

Fig. 4 is a perspective view of a preferred embodiment of the open line shaft bearing of my invention.

Fig. 5 is a diagrammatic view illustrating the manner of inserting one of the bearings of my invention into a pump tubing.

Fig. 6 is a view similar to Fig. 3 and in the same scale and shows a modified form of the bearing of my invention which is provided for use in pump tubings of much larger diameter than that with which the bearing shown in the other views is adapted for use.

Referring specifically to the drawing, and particularly to Fig. 1, the numeral 10 indicates a deep water well having a casing 11 on which is installed a pumping apparatus 12 for pumping water from the well. The apparatus 12 includes a casing head 13 on which is supported an electric motor 14 and from which is suspended a pump tubing 15 having at its lower end a rotary pump 16. The pump 16 is operated by the motor 14 through an open line shaft 17 which extends downwardly through the tubing 15. The tubing 15 is made up of sections 18 joined by couplings 19. The shaft 17 is made up of sections 20 joined by couplings 21.

Although not universal, it is common practice to provide the line shaft 17 with wear-resistant sleeves 22 which may be formed of stainless steel and sweated in place on the shaft or they may be formed on an electrolytically-applied coating of chromium, as disclosed in my U. S. Patent No. 2,208,975 issued July 23, 1940, on Open line shaft bearing.

It is preferable that the bearings in the pump tube 15 for the line shaft 17 be located uniform distances apart and for a 3-inch standard pump tubing, as shown in Figs. 2, 3 and 5, these bearings are spaced uniformly at intervals of 10 feet. In assembling the apparatus 12 in the well 10 in the field, it is frequently found that joints between tubing sections 18 do not come directly opposite the location of the sleeves 22 on the shaft 17 and it is therefore necessary to cut and rethread these tube sections where the bearings must be located at the joints, in the tubing, as is now common practice.

This inconvenience is avoided in my present invention wherein I provide a bearing 25 (see Fig. 4) which is suitable for pump tubings with an inside diameter up to 4 inches. This bearing includes a unitary cast body 26 of rubber having a bearing aperture 27, which is centrally formed in said body, and also having longitudinal passages 28 provided between legs 29. One end of the rubber body 26 is tapered as indicated at 30. In one sense, the body 26 and legs 29 constitute an expansive self-positioning spider embodying a rubber bearing as a homogeneous part thereof.

The manner of installing one of the bearings 25 of my invention in the well tubing 15 is shown in Fig. 5. Here it is to be noted that this bearing has an outside diameter which is greater than the inside diameter of the tubing 15. The taper 30 thus greatly facilitates the insertion of the bearing into the tube. After the tapered portion of the bearing has been inserted in the upper end of the tube, the tubular follower 35 is placed upon the upper end of the bearing and a hammer applied. The bearing is thus driven into the tube 15 such a distance as to bring it into proper bearing relation with the adjacent sleeve 22 provided on the shaft 17.

In Fig. 5 broken lines 36 illustrate the position to which the bearing 25 is, in one instance, driven by the follower 35. Fig. 2 shows one of the bearings 25 completely installed in proper relation with one of the sleeves 22 on the shaft 17. A comparison of this view with Fig. 5 however shows how the sleeves 22 vary in their relation to the adjacent joint of the pump tubing. This merely illustrates the common variation occurring in the installation of pumps in the field and also indicates the great ease with which these variations are met by my present invention.

It is to be noted that the bearing 25 is a homogeneous piece of rubber and, as aforestated, this type of bearing is suitable for use in tubes having an inside diameter up to 4 inches. In pump installations where the pump tubing is of larger inside diameter than 4 inches, I find it preferable to use a reinforced bearing 40, as illustrated in Fig. 6. The bearing 40 is similar in every respect to the bearing 25 excepting that it is of course larger and is provided with a reinforced skeleton 41 which may be of metal or any other suitably rigid material which will stiffen the rubber body of the bearing 40 and cause it to retain its position in the tubing 42 in which it is installed.

While rubber of varying degrees of hardness may be used in the bearings of my invention, it is preferable that the rubber used therein be approximately of the same hardness as that ordinarily used for rubber bearings in water pumps.

It is of course to be understood that while the bearings of my invention have a very snug fit within the tubing in which they are installed, they provide a relatively smooth, water lubricated bearing surface to the shaft 17 so that this at all times freely journals in the bearing apertures 27 of the bearings 25 throughout the length of the well 10.

It is also to be noted that the constant expansive force which each of the bearing legs 29 exerts against the smooth inner face of the pump tubing causes these legs in a short period after the assembly of the pump apparatus 12, to adhere to the pump tubing almost as tenaciously as if vulcanized thereto. This is an especially advantageous feature of the invention and where desired to augment or hasten this action a suitable cement, such as rubber cement, may be applied between the legs 29 and inner tubing surfaces at the time the bearings 25 are installed.

Where such cementing is resorted to, it is not necessary to make the bearings 25 as much larger in diameter than the inner diameter of the pump tubing as is preferable where no cement is used. Where cementing is omitted, I find it good practice for the outer diameter of the bearing bodies 26 to exceed the inner diameter of the tubing by about one-eighth of an inch.

From the foregoing description it is also to be noted that the bearings of my invention present a completely nonmetallic surface to the pump tubing so that there is no opportunity for galvanic action to develop.

It is also to be noted that after the pumping apparatus has been operated a sufficient length of time for the corrosive resistant sleeves 22 to become worn where these journal in the bearings 25, these bearings may then be shifted opposite different portions of these sleeves so as to produce new and accurate journals between these sleeves and these bearings.

While I have shown and described herein only a single preferred embodiment of my invention, with a single modification thereof for use in large wells, it is to be understood that various changes may be made in these forms without departing from the spirit of the invention or the scope of the appended claims.

What I claim is:

1. A pump tubing and bearing assembly suitable for supporting a rotary water well pump, for housing a line shaft for driving said pump and providing bearings for spaced journals thereof, and for conducting water discharged from said pump upwardly to the top of the well, said assembly comprising a series of tubing sections connected by couplings and a series of rubber spiders each of which provides a rubber bearing for said shaft, said spiders being thrust into said tubing sections to position said bearings at the proper spaced intervals for receiving the journals of said shaft, said rubber spiders having such a degree of stiffness and having a normal diameter sufficiently greater than the interior diameter of said tubing that when so thrust into place in said tubing said spiders are permanently assembled therewith for indefinite service in the operation of said pump.

2. A bearing adapted for permanent location in a pump tubing for receiving a journal of an open line shaft disposed therein, said bearing comprising: a unitary body of rubber having a bearing opening, in which said shaft freely journals, and a plurality of legs extending outwardly, said legs being separated by longitudinal passages accommodating the flow past said bearing of water pumped through said tubing, said rubber being of such a stiff though resilient character and the outer diameter of said legs being sufficiently greater than the interior diameter of said tubing as to permanently retain said body as positioned in said tubing when said body is thrust axially into said tubing.

3. A bearing adapted for permanent location in a pump tubing for receiving a journal of an open line shaft disposed therein, said bearing comprising: a unitary body of rubber having a bearing opening, in which said shaft freely journals, a plurality of legs extending outwardly, said legs being separated by longitudinal passages accommodating the flow past said bearing of water pumped through said tubing, said rubber being of such a stiff though resilient character and the outer diameter of said legs being sufficiently greater than the interior diameter of said tubing as to permanently retain said body as positioned in said tubing when said body is thrust axially into said tubing; and a stiffening reinforcement imbedded in said rubber body.

4. A bearing adapted for permanent location in a pump tubing for receiving a journal of an open line shaft disposed therein, said bearing comprising: a bearing body having a bearing opening in which said shaft freely journals and a plurality of legs formed of resilient rubber and extending outwardly from said body, said legs being separated by longitudinal passages accommodating the flow past said bearing of water pumped through said tubing, said rubber being of such stiff though resilient character and the outer diameter of said legs being sufficiently greater than the interior diameter of said tubing as to permanently retain said bearing as positioned in said tubing when said bearing is thrust axially into said tubing.

5. A bearing adapted for permanent location in a pump tubing for receiving a journal of an open line shaft disposed therein, said bearing comprising: a bearing body having a bearing opening in which said shaft freely journals and a plurality of legs formed of resilient rubber and extending outwardly from said body, said legs being separated by longitudinal passages accommodating the flow past said bearing of water pumped through said tubing, said rubber being of such a stiff though resilient character and the outer diameter of said legs being sufficiently greater than the interior diameter of said tubing as to permanently retain said bearing as positioned in said tubing when said bearing is thrust axially into said tubing, said legs at one end of said bearing being bevelled to facilitate the insertion of said bearing in said tubing.

JAMES M. HAIT.